US009451307B2

United States Patent
McClanahan et al.

(10) Patent No.: US 9,451,307 B2
(45) Date of Patent: Sep. 20, 2016

(54) GENERATING RECOMMENDATIONS BASED ON PROCESSING CONTENT ITEM METADATA TAGS

(71) Applicant: MICROSOFT TECHNOLOGY LICENSING, LLC, Redmond, WA (US)

(72) Inventors: Joseph Lloyd McClanahan, Redmond, WA (US); Asmita Kulkarni, Seattle, WA (US); Travis Albert Sein, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/563,624

(22) Filed: Dec. 8, 2014

(65) Prior Publication Data
US 2016/0165289 A1    Jun. 9, 2016

(51) Int. Cl.
*H04H 60/33* (2008.01)
*H04N 21/262* (2011.01)
*G06F 17/30* (2006.01)
*H04N 21/2668* (2011.01)
(Continued)

(52) U.S. Cl.
CPC .. *H04N 21/26208* (2013.01); *G06F 17/30044* (2013.01); *G06F 17/3082* (2013.01); *G06F 17/30598* (2013.01); *G06F 17/30752* (2013.01); *H04N 21/251* (2013.01); *H04N 21/25891* (2013.01); *H04N 21/2668* (2013.01); *H04N 21/26258* (2013.01); *H04N 21/44222* (2013.01); *H04N 21/812* (2013.01)

(58) Field of Classification Search
CPC ............................... H04N 21/26208
USPC ............................................................ 725/9
See application file for complete search history.

(56) References Cited

U.S. PATENT DOCUMENTS 7,614,064 B2   11/2009 Zigmond
8,660,539 B2    2/2014 Khambete et al.
(Continued)

FOREIGN PATENT DOCUMENTS

WO   2013143618 A1   10/2013

OTHER PUBLICATIONS

Darnell, Michael J., "How Do People Really Interact With TV? Naturalistic Observations of Digital TV and Digital Video Recorder Users", In Proceedings of ACM Computers in Entertainment, vol. 5, No. 2, Article 10, Aug. 2007, 12 pages.
(Continued)

*Primary Examiner* — Michael Hong
(74) *Attorney, Agent, or Firm* — Bryan Webster; Judy Yee; Micky Minhas

(57) ABSTRACT

A device, method, and computer-readable media for managing interrupt times for content items based on metadata encapsulating user behavior. A user controls the playback of content items such as audio or videos. The content items may be episodes in a programming series. Tags are associated with the content items. These tags include metadata having playback time of the received user interactions. In turn, the device processes the tags to identify user interaction that include stop events for the content items. The tags are processed based on a sliding time window. The playback times of the stop events are selected as potential interrupt times that the device may include recommendations for unaired episodes. The selected interrupt times are also used to identify inconsistencies in the metadata.

20 Claims, 5 Drawing Sheets

(51) Int. Cl.
*H04N 21/25* (2011.01)
*H04N 21/258* (2011.01)
*H04N 21/442* (2011.01)
*H04N 21/81* (2011.01)

(56) References Cited

U.S. PATENT DOCUMENTS

| | | |
|---|---|---|
| 8,719,865 B2 | 5/2014 | Moonka et al. |
| 8,745,647 B1 | 6/2014 | Shin et al. |
| 2008/0010118 A1 | 1/2008 | Howell et al. |
| 2009/0094253 A1 | 4/2009 | Hanai |
| 2009/0183210 A1 | 7/2009 | Andrade |
| 2010/0162286 A1* | 6/2010 | Berry .................... H04H 60/33 725/14 |
| 2010/0199295 A1 | 8/2010 | Katpelly et al. |
| 2013/0013372 A1 | 1/2013 | Gomez Uribe et al. |
| 2013/0139192 A1 | 5/2013 | Fontan et al. |
| 2014/0229990 A1* | 8/2014 | Lee .................. H04N 21/26283 725/46 |
| 2014/0282709 A1 | 9/2014 | Hardy et al. |

OTHER PUBLICATIONS

"International Search Report and Written Opinion Issued in PCT Application No. PCT/US2015/062871", Mailed Date: Feb. 9, 2016, 11 Pages.

* cited by examiner

US 9,451,307 B2

GENERATING RECOMMENDATIONS BASED ON PROCESSING CONTENT ITEM METADATA TAGS

BACKGROUND

Conventionally, videos are played on computing devices. The videos are available on the Internet and accessed by media players executed by the computing devices. Users of the computing devices control playback of the videos through controls provided by the media players. In turn, the videos are rendered on the computing devices.

Online playback of the videos is monetized by allowing companies to arrange placement of commercials or promotions upon selection of videos by users of the computing devices. Companies have commercials or promotions rendered during playback of the video, before playback of the video, or after playback of the video. In some conventional systems, the promotions may be part of the video and are rendered during playback. In other conventional systems, the promotions or commercials are layered above the video during playback. The layered promotions or commercials are rendered for a specific period of time and may include graphical buttons (e.g., purchase, close, more product information).

The companies arrange for a number of impressions of the videos for the promotions or commercials. The conventional promotions or commercials are rendered in a pre-determined location and at a predetermined video playback time. The companies have no assurance that promotions or commercials are not ignored during video playback. Moreover, the conventional playback systems are unable assure that users watch other videos from the author or publisher of the rendered video. To improve performance of the conventional video playback, it may be necessary to retain user attention and obtain user playback of a next video (e.g., a subsequent episode of the video programming) in a series. The improved performance may lead to increases in sales for the companies and video sales for the author or publisher of the video programming.

SUMMARY

Aspects of embodiments of the invention relate to processing content item metadata and generating recommendations. More specifically, aspects of the embodiments of the invention relate to generating and transmitting recommendations to users during content item playback on computing devices.

Embodiments of the invention relate to systems, devices, methods, and computer-readable media for, among other things, processing user metadata tags of rendered content items (e.g., videos or audio) to generate recommendations. The recommendations, in one embodiment, include a suggested time for rendering a post-roll during playback of the content items. The post-roll experience includes, among other things, the playback of a suggested content item (e.g., next episode in a series).

Embodiments of the invention relate to systems, devices, methods, and computer-readable media for, among other things, generating recommendations for a plurality of content items. The device obtains time and user interaction information for each of the plurality of content items. In turn, metadata tags are associated with each of the plurality of content items at the time of user interaction. The metadata tags vary based on the type of user interaction, in at least one embodiment. For each content item, the device performs the following. The device groups metadata tags based on type of user interaction. In turn, the metadata tags are counted for each of the groups by the device. The group with the largest number of metadata tags is identified by the device, which retrieves times associated with the metadata tags in the largest group. Based on the retrieved times, the device selects an interrupt for the content item.

In other embodiments, a computer system manages the metadata tags. The computer system includes a server and a metadata database. The metadata database stores references to a plurality of content items. Additionally, the metadata database stores metadata tags corresponding to user interactions with the plurality of content item. In one embodiment, times associated with the user interactions with the plurality of content items are stored in metadata database with the metadata tags corresponding to the user interactions. The server processes the metadata tags and identifies interrupt times for each content item based on the metadata tags corresponding to each content item. In turn, the server predicts interrupt times for similar content items in at least one embodiment.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The embodiments of the invention are described in detail below with reference to the attached drawing figures, wherein.

DETAILED DESCRIPTION

Figure 1:
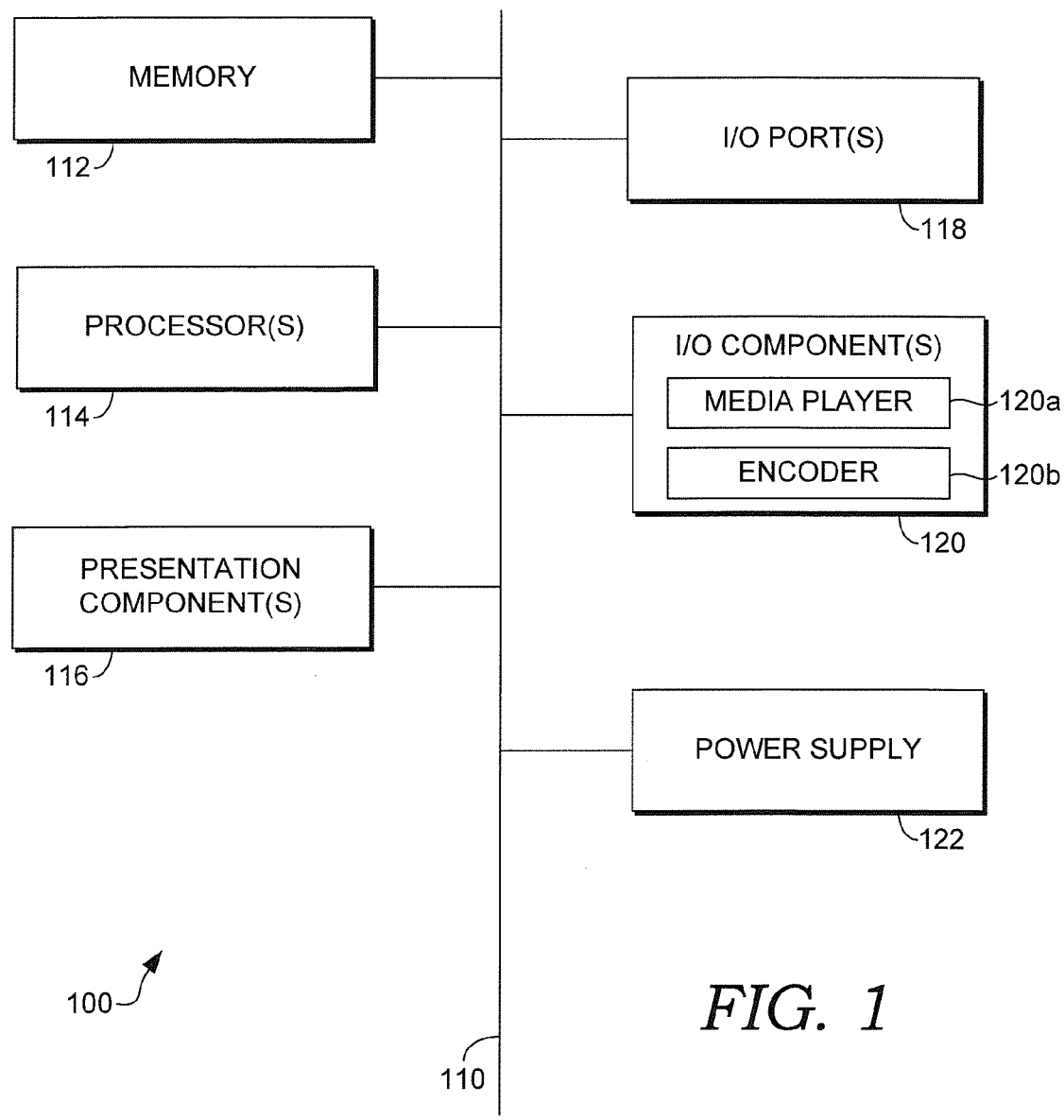
FIG. 1 is a block diagram illustrating an exemplary content item metadata tags computing environment suitable for implementing embodiments of the invention.

The subject matter of this patent is described with specificity herein to meet statutory requirements. However, the description itself is not intended to necessarily limit the scope of the claims. Rather, the claimed subject matter might be embodied in other ways to include different steps or combinations of steps similar to the ones described in this document, in conjunction with other present or future technologies. Although the terms "step," "block," or "component," etc., might be used herein to connote different components of methods or systems employed, the terms should not be interpreted as implying any particular order among or between various steps herein disclosed unless and except when the order of individual steps is explicitly described.

As utilized herein, the term "content items" include audio, video, pictures, or multimedia files.

As utilized herein, the term "series" refers to a set of episodes. For instance, a series may include 10-20 episodes. The episodes in the series are content items that share an author and title but differ in media rendered during playback.

As utilized herein, the term "season" refers to a predetermined number of series. For instance, a season may include 1-10 series. For instance, season 1 follows season 2, which follows season 3. Each season include a series of episodes (e.g., 13).

Embodiments of the invention provide recommendations that include an indication of an appropriate time to interrupt playback of content items and provide promotional, commercial, or post-roll content. The exact timing of when to interrupt playback is crucial. Waiting too long during content item playback will cause users to lose interest as credits or other low value content is rendered on the computing device. On the other hand, interrupting content item playback too soon may annoy consumers and impact the perceived usefulness of the recommendations. Embodiments of the invention generate the recommendations without data for the content item, manual inspection of data for the content item, or automatic analysis (e.g., character recognition, facial recognition, etc.) of data for the content item. Accordingly, computing resources (memory, video buffers, or processors) may be cleared and quickly made available to other content items when the appropriate interrupt time is reached for the rendered content item. The interrupt may be triggered automatically reducing user input errors (e.g. closing the media render or hitting the wrong button (rewind instead of stop) during media rendering.

In some embodiments, the interrupt time is generated by a network server having metadata for the content items. The metadata includes tags for various user interactions. The network server identifies user behaviors for detecting an appropriate interrupt time. In one embodiment, the interrupt time is detected based on when a user interaction is an event that stops the playback of the content. The network server may perform a frequency sample on a stream of metadata data containing stop events for each content item. The network server may group the metadata tags and identify the largest grouping of metadata tags for each content item. In one embodiment, the tags are grouped by type (e.g. stop). Additionally, the tags, for each content item, may be grouped along a sliding playback time window. Based on the playback times associated with the largest grouping of tags, the network server selects a recommended interrupt time.

The generated recommendations may include predictions. In some embodiments, the network server may recommend interrupt times for similar content items in a series. The similar content items in the series, in some embodiments, include un-aired content items. Additionally, the network server may perform error checking of the grouped tags based on histograms generated for each content item. Accordingly, embodiments of the invention determine when to render promotional, commercial, or post-roll content such that a user does not lose interest and is engaged in watching subsequent content items (e.g., next episode of a TV show). The additional impressions of related content items may allow companies, publishers, or content providers to to increase consumption and sales.

In one embodiment, a computer system for managing metadata tags is provided. The computer system includes a metadata database and a server. The metadata database stores a plurality of content items, tags corresponding to user interactions with the plurality of content item, and times associated with the user interactions with the plurality of content items. The server processes the tags and identifies interrupt times for each content item based on the tags corresponding to each content item. In some embodiments, the network server generated recommendations that include predicted interrupt times for similar content items.

The similar content items are episodes in a series in some embodiments. For instance, the similar content items may include unaired episodes in the series. The recommendations for content items that are members of a series of episodes may be based on interrupt times for aired content items having tags in the metadata database. The similar content items are videos or audio media.

FIG. 1 is a block diagram illustrating an exemplary content item metadata tags computing environment suitable for implementing embodiments of the invention. Referring to the figures in general and initially to FIG. 1 in particular and computing device 100 that is configured to generate recommendations for content items rendered by the computing device 100. The computing device 100 is but one example of a suitable computing environment and is not intended to suggest any limitation as to the scope of use or functionality of embodiments of the invention. Neither should the computing device 100 be interpreted as having any dependency or requirement relating to any one component, or combination of components, illustrated.

The embodiments of the invention may be described in the general context of computer code or machine-useable instructions, including computer-executable instructions. These instructions may include program components being executed by a computer or other machine (e.g., a personal data assistant or other handheld device). Generally, program components, including routines, programs, applications, objects, components, data structures, and the like, refer to code that performs particular tasks or implements particular abstract data types. Embodiments of the invention may be practiced in a variety of system configurations, including handheld devices, tablet computers, gaming devices, consumer electronics, general-purpose computers, specialty computing devices, etc. Embodiments of the invention may also be practiced in distributed computing environments or cloud environments, where tasks are performed by remote-processing devices that are linked through a communications network.

As one skilled in the art will appreciate, the computing device 100 may include hardware, firmware, software, or a combination of hardware and software. The hardware includes processors and memories configured to execute instructions stored in the memories. The logic associated with the instructions may be implemented, in whole or in part, directly in hardware logic. For example, and without limitation, illustrative types of hardware logic include field programmable gate array (FPGA), application-specific integrated circuit (ASIC), system-on-a-chip (SOC), or complex programmable logic devices (CPLDs). The hardware logic allows a computing device to provide post-roll content (e.g., promotions or commercials) at an appropriate interrupt time for each rendered content item. The device is configured to receive metadata tags for each content item. In certain embodiments, the computing device groups the metadata tags. Based on group sizes, the computing device may select the interrupt time for each content item. The device may, in an embodiment, render the post-roll content at the selected interrupt time.

With continued reference to FIG. 1, computing device 100 includes a bus 110 that directly, or indirectly, couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component, such as a display device, to be an I/O component. Also, processors have memory. The inventors hereof recognize that such is the nature of the art and reiterate that the diagram of FIG. 1 is merely illustrative of an exemplary computing device that can be used in connection with one or more embodiments of the invention. Distinction is not made between such categories as "workstation," "server," "laptop," "handheld device," "multimedia player," "gaming device," etc., as all are contemplated within the scope of FIG. 1 and refer to "computer" or "computing device."

Computing device 100 typically includes a variety of computer-readable media. Computer-readable media can be any available media that is accessible by computing device 100 and includes both volatile and nonvolatile media, removable and non-removable media. Computer-readable media may comprise computer storage media and communication media.

Computer storage media includes volatile and nonvolatile, removable and non-removable media implemented in any method or technology for storage of information, such as computer-readable instructions, data structures, program modules, or other data. Computer storage media includes, but is not limited to, Random Access Memory (RAM), Read Only Memory (ROM), Electronically Erasable Programmable Read Only Memory (EEPROM), flash memory or other memory technology, CD-ROM, digital versatile disks (DVDs) or other holographic memory, magnetic cassettes, magnetic tape, magnetic disk storage or other magnetic storage devices, or any other medium that can be used to encode desired data and that can be accessed by the computing device 100. In an embodiment, the computer storage media can be selected from tangible computer storage media like flash memory. These memory technologies can store data momentarily, temporarily, or permanently. Computer storage does not include, and excludes, communication media.

On the other hand, communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media such as acoustic, RF, infrared and other wireless media.

Memory 112 includes computer storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components 116 include a display device, a digital ink-enabled surface, a speaker, a printing component, a vibrating component, etc. I/O ports 118 allow computing device 100 to be logically coupled to other devices including I/O components 120, some of which may be built in. Illustrative I/O components include a microphone, joystick, game pad, satellite dish, scanner, printer, wireless device, controller (such as a writing instrument, stylus, keyboard, and mouse), or natural user interface (NUI), etc. The I/O components 120 may include media player 120*a* and encoder 120*b*. The media player 120*a* receives user interaction for rendered content items. In turn, the received user interaction information is processed to perform an appropriate action and the user interaction may be encoded as metadata for storage in metadata database. In one embodiment, the metadata database is stored in memory 112.

The NUI processes gestures (e.g., hand, face, body, etc.), voice, or other physiological inputs generated by a user. Some of these inputs may be interpreted as user interactions with the rendered content item. The input of the NUI may be transmitted to the appropriate network elements for further processing. The NUI implements any combination of speech recognition, touch and stylus recognition, facial recognition, biometric recognition, gesture recognition both on screen and adjacent to the screen, air gestures, and head and eye tracking associated with displays on the computing device 100. The computing device 100 may be equipped with depth cameras, such as stereoscopic camera systems, infrared camera systems, RGB camera systems, surface sensors, and combinations of these, for gesture detection and recognition. Additionally, the computing device 100 may be equipped with accelerometers or gyroscopes that enable detection of motion or pressure. The output of the accelerometers or gyroscopes is provided to the memory 112 for storage and processing. Additionally, the output of the accelerometers or gyroscopes is provided to the display of the computing device 100 to render immersive augmented reality or virtual reality during content item playback.

As previously mentioned, embodiments of the invention are generally directed to systems, methods, and computer-readable storage media for, among other things, providing recommendations for content items based on user interactions received during content item playback. The recommendations may include predictions for content items in a series that are similar to rendered content items. The computing device generates the recommendations and stores the recommendations in a metadata database having user interaction data for the rendered content items.

Various aspects of the technology described herein are generally employed in computer systems, computer-implemented methods, and computer-readable storage media for, among other things, grouping metadata tags and selecting interrupt times for the grouped metadata tags. In one embodiment, a server executes processing components that obtain metadata tags for content items. The metadata tags are selected based on the user interaction with the content item at the computing device. The server may provide recommendations that specify a selected interrupt time for the content items.

In one embodiment, a computer system is configured to process metadata tags for user interactions with the content items. The computer system includes, among other components, a media player component, recommendation component, and processing component. The media player component may format the content item for rendering on a computing device. The processing component may receive the user interactions (e.g., metadata tags) and determine the appropriate interrupt time for the content item based on the user interactions. The recommendation component may generate predictions that include the appropriate interrupt time for content items similar to the rendered content items.

Figure 2:
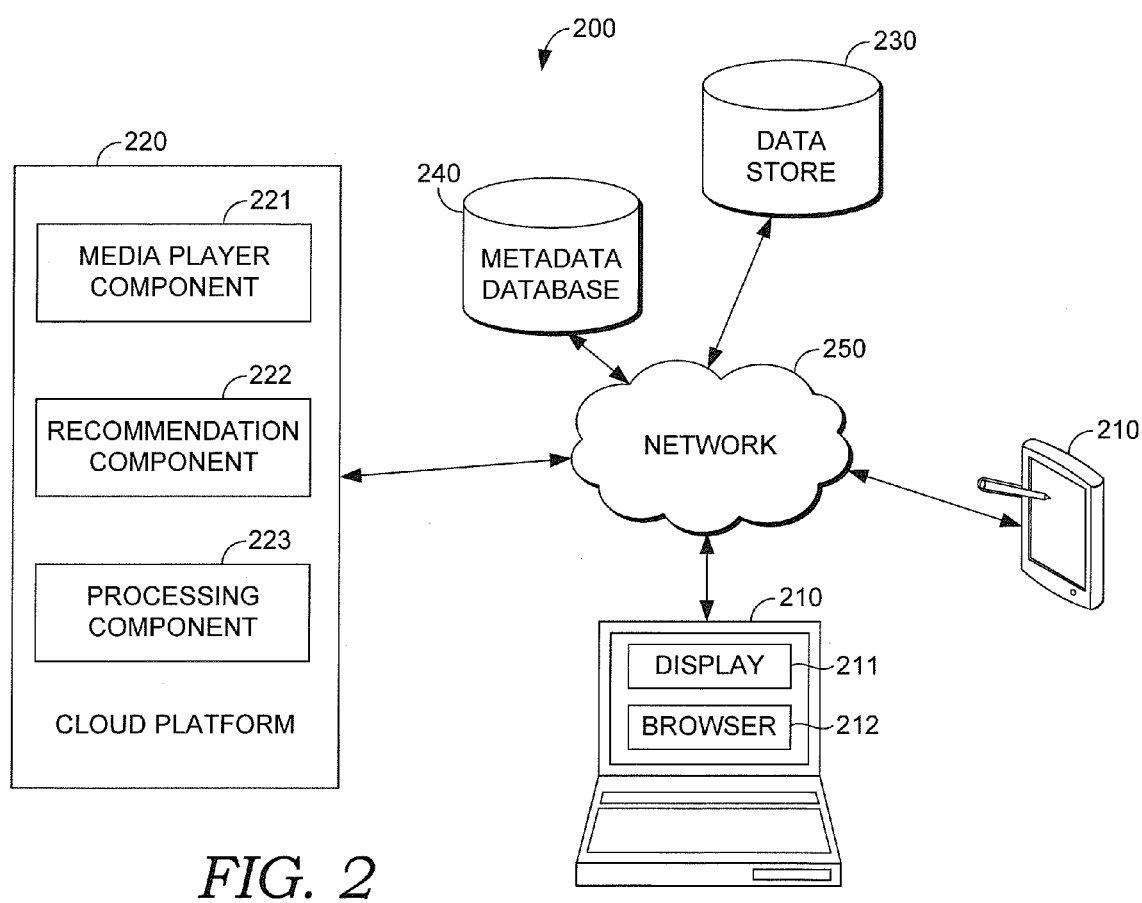
FIG. 2 is a network diagram illustrating a network environment suitable for implementing embodiments of the invention.

FIG. 2 is a network diagram illustrating a network environment suitable for implementing embodiments of the invention. The computing system 200 may include client devices 210, server 220, data store 230, and network 240. The network 240 may communicatively connect the client devices 210, server 220, and data store 230. It should be understood that any number of client computing devices 210, servers 220, and data stores 230 may be employed in the computing system 200 within the scope of embodiments of the invention. Each may comprise a single device/interface or multiple devices/interfaces cooperating in a distributed environment. For instance, the server 220 may comprise multiple devices and/or modules arranged in a distributed environment or cloud environment that collectively provide the functionality of the server 220 described herein. Additionally, other components/modules not shown also may be included within the computing system 200.

In some embodiments, one or more of the illustrated components/modules may be implemented as stand-alone applications. In other embodiments, one or more of the illustrated components/modules may be implemented via the client devices 210, as an Internet-based service, or as a module inside the server 220. It will be understood by those of ordinary skill in the art that the components/modules illustrated in FIG. 2 are exemplary in nature and in number and should not be construed as limiting. Any number of components/modules may be employed to achieve the desired functionality within the scope of embodiments hereof. Further, components/modules may be located on any number of search engines or user computing devices. By way of example only, the server 220 might be provided as a single server (as shown), a cluster of servers, or a computing device remote from one or more of the remaining components.

The client devices 210 may be used to render content items and process user interactions to the rendered content items. The client devices 210 may transmit the received user interactions to the server 220. In an embodiment, the client devices 210 may include any type of computing device, such as the computing device 100 described with reference to FIG. 1, for example.

Generally, the client device 210 includes a display 211 and a browser 212. The display 211 is configured to render content. The display 211 may also be configured with surface sensors. The surface sensors detect input (e.g., touch or gestures) received from a user on or near the surface of the display. In one embodiment, the display 211 is further configured to recognize user touch or gesture inputs as user interaction with the rendered content in response to processing performed by an NUI. The user interactions may cause the rendered content to stop, rewind, pause, fast forward, etc. The user interactions may be stored in a log at the client device 210. The log may include user interactions for each user of the client device. The log may also include identifiers for the content items that received the logged user interactions.

The browser 212 of the client device 210 may be updated to render post-roll content during playback of the content item in some embodiments. The browser 212 is configured to render multimedia content, for instance, web pages, video files, audio files, etc., in association with the display 211 of the client computing device 210. The browser 212 is further configured to receive user input for, among other things, selecting or modifying the content items rendered on the display 211. In some embodiments, the content items are stored in the data store 230 and the browser accesses the data store to render the content items. The browser 212 may be any suitable type of web browser such as INTERNET EXPLORER®, FIREFOX®, CHROME®, SAFARI®, or other type of software configured to render content items and receive user interactions as described herein. It should be noted that the functionality described herein as being performed by the browser 212 may be performed by any other application capable of rendering multimedia content. Any and all such variations, and any combination thereof, are contemplated to be within the scope of embodiments of the invention.

The server 220 is configured to receive the user interactions from the client devices 210; associate metadata tags with the user interactions; and generate recommendations for content items based on the associated metadata tags. The server may implement any combination of the following components to process the user input: a media player component 221, a recommendation component 222, and a processing component 223. In one embodiment, the components of the server 220 may be executed locally by the client devices 210 to process the user interactions received by the client devices 210.

The media player component 221, in one embodiment, receives user input from the client devices 210. The user input may pause, fast-forward, change resolution, or stop the content item. The media player component 221 is configured to process the user input and to save the user interaction in the metadata database 240. In one embodiment, the processing component 223 interprets the user interaction and associates a metadata tag with the user interaction. In turn, the user interaction and metadata tag are stored together in the metadata database 240. The user input including playback time at which the user input is received at the client device 210 may be encoded in a metadata tag by the processing component 223.

The recommendation component 222 analyzes the metadata tags stored in the metadata database 240. For each content item having metadata tags, the recommendation component 222 determines an appropriate interrupt time. The recommendation component 222 receives the metadata tags for the content items stored in the data store 230. The metadata tags may identify the user interactions such as play, stop, pause, rewinds, exit, etc. The recommendation component 222 may store the recommendations for each content item in the metadata database 240.

The processing component 223 may process all user interactions for each rendered content item on a collection of client devices. The processing component 223 may focus on a configurable segment (i.e., tail end) of the playback period for each content item. In one embodiment, the processing component 223 obtains user interactions received during the last 20% of the playback duration for the content items. For instance, if a content item has a duration of 10 minutes. The processing component 223 obtains all logged user interactions with the content item that were received between 8 and 10 minutes. In turn, the processing component generates a list that identifies users and each content item having logged user interaction information. In the list for each content item, the processing component 223 includes, among other things, the number of users that provided user interaction information, the user interactions that were received, and a remaining time before the end of the playback time (i.e., an offset from end) at which each of the user interactions (e.g. exits) was received. An example list generated by the processing component 223 may be the following:

| USER | Content | Stop | Length |
|------|---------|------|--------|
| JOE | Multimedia 1 | 20 | 22 minute |
| CRUSH | Multimedia 1 | 21:30 | 22 minutes |

In some embodiments, the recommendation component 222 receives the list of user interactions from the processing component. In turn, the recommendation component 222 may determine whether there are enough logged user interactions (i.e., more than 100 user interactions) to make confident recommendations. The recommendation component 222, in one embodiment, confirms that the same multimedia rendered by the users have the same playback duration plus or minus five seconds. The recommendation component 222 may verify that for (each user accessing the same multimedia) the playback duration metadata for the rendered multimedia is within a five second variance. The recommendation component 222 clusters the logged user interactions. In one embodiment, the clusters are generated by the recommendation component 222 if there if at least 100 logged user interactions are available in the list. Based on the clustered user interactions, the system generates recommended interrupt times.

The data store 230 is accessed by the server 220 to obtain stored content items. The data store 230 stores the content items that are accessible and rendered by the client devices 210. The data store 230 may be a relational database that includes an index to content items. The data store 230 may also include a log that tracks download or playback statistics (e.g., location of playback, number of downloads, number of plays, etc.) for each of the associated multimedia content items rendered by the media player component 221 or the client devices 210. These statistics are provided to the client devices 210 upon request.

The metadata database 240 is configured to store the metadata tags associated with the user interaction. The metadata database 240 may also store recommendations generated by the server 220 for each content item. The metadata database 240 is accessed by the server to group metadata tags and to determine the largest grouping of metadata tags. In some embodiments, the metadata tags for different types of user interaction have different identifiers. For instance, a metadata tag for a stop user interaction will have a different identifier than a metadata tags for a pause user interaction.

The network 250 communicatively connects the client devices 210, server 220, data store 230, and metadata database 240. The network 250 may include, without limitation, one or more local area networks (LANs) and/or wide area networks (WANs). Such networking environments are commonplace in offices, enterprise-wide computer networks, intranets, and the Internet. Accordingly, the network 250 is not further described herein.

The exemplary computing system 200 in which embodiments of the invention are employed is described above. Generally, the computing system 200 illustrates an environment in which user interaction are processed to generate recommendations for content items. As will be described in further detail below, embodiments of the invention provide methods and graphical user interface elements for assigning metadata tags to content items, and predicting appropriate interrupt times for unaired content items. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional components that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Accordingly, a computer device may have computer storage media that may store computer-usable instructions for a computer-implemented method that associated metadata tags with content items. The computing device may obtain user interaction information for content items. In turn, the computing device associates the metadata tags with the content items. The computing device may group the metadata tags and select interrupt times for the content items. The selected interrupt times are included in recommendations generated by the computing device for each content item. The interrupt times are selected based on, among other things, the playback time of the largest grouping of metadata tags. In some embodiments, the computing device performs a frequency sample on a collection of metadata data tags containing stop events for each content item. The computing device may identify the grouped metadata tags with the largest frequency shift within a sliding playback time window for the content item. In other words, the computing device determines the local maximum for the metadata tags within the sliding playback time windows for the content.

Figure 3:
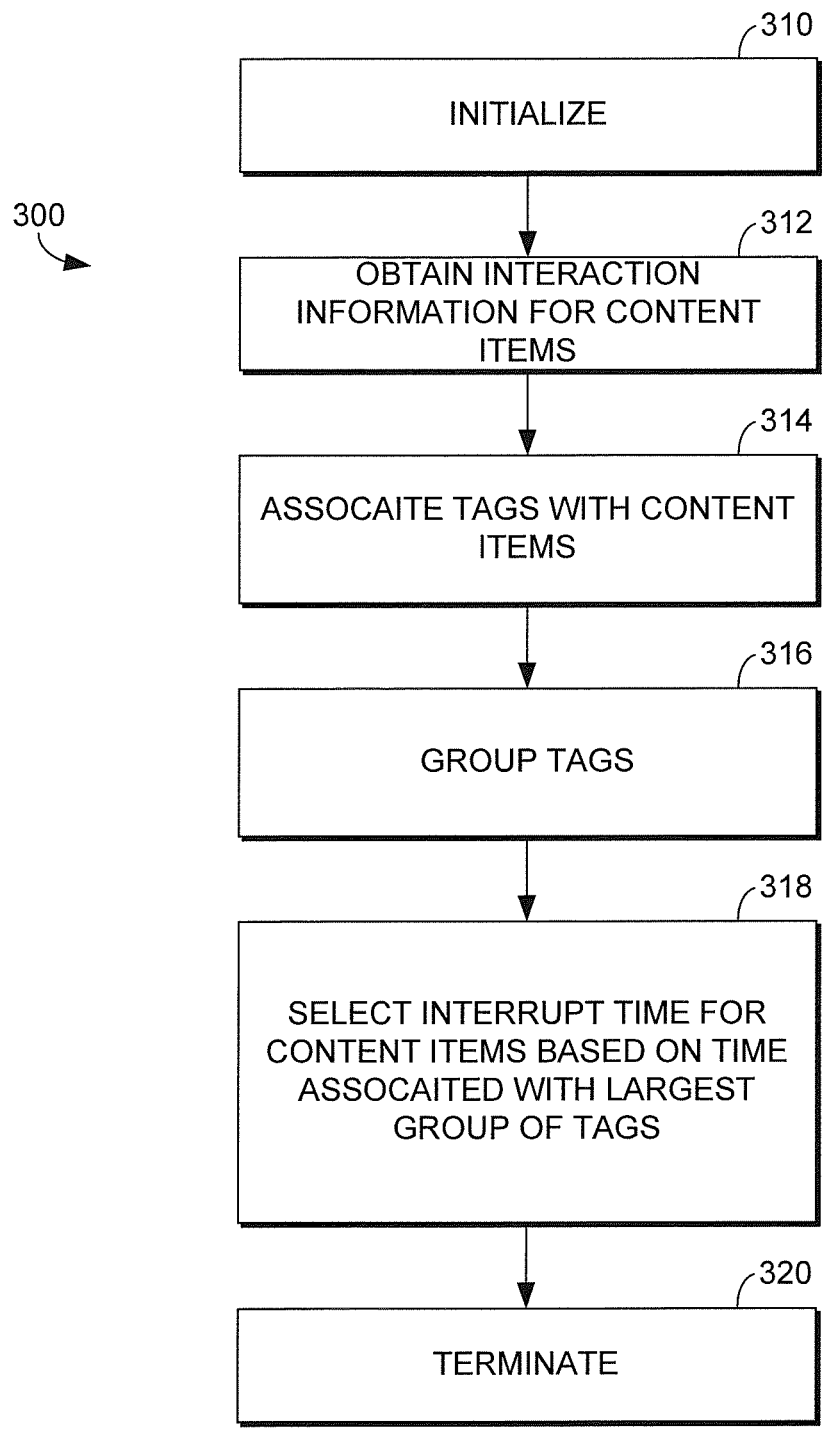
FIG. 3 is a logic diagram illustrating a computer-implemented method of associating metadata tags with content items, in accordance with embodiments of the invention.

FIG. 3 is a logic diagram illustrating a computer-implemented method 300 of associating metadata tags with content items, in accordance with embodiments of the invention. The computing device initializes the method in step 310. In step 312, the computing device obtains time and user interaction information for each of the plurality of content items. The plurality of content items includes videos or audio media.

The times, in one embodiment, are specific playback times for each of the content items. The user interactions for the content items are received during the specific playback time of the content item. The user interaction may include any of the following: fast-forward, rewind, stop, pause, mute, change volume, change size, change playback speed, change quality, etc. Each user interaction has a different metadata tag. In turn, metadata tags are associated with each of the plurality of content items at the time of user interaction by the computing device, in step 314. In some embodiments, the metadata tags vary based on the type of user interaction with the content items. In some embodiments, the metadata tags are objects that store user identifier, time of user interaction, and type of user interaction. A subset of the plurality of content items may be part of a series.

The computing device performs the following for each content item. In step 316, the computing device groups the metadata tags based on type of user interaction at various time segments within content playback duration. The metadata tags in each group are counted by the computing device to identify the group with the largest number of tags. The metadata tag groups are formed within one or more time windows by the computing device. The one or more time windows may be approximately 10 seconds. The sizes of the time windows are configurable in some embodiments.

The computing device may identify a window of time having the largest number of metadata tags. The computing device retrieves playback times associated with the grouped metadata tags. In some embodiment, the computing device groups all user interactions within each ten second window from the playback time for each user interaction from the beginning of the tail end of the content item to the user interactions received 10 second before the end of the playback time for the content item.

In step 318, the computing device selects, in some embodiments, an interrupt time for the content item based on the time associated with the largest number of grouped tags within the selected window of time. In some embodiments, the largest number of grouped tags is identified by locating the largest frequency shift for all time windows within the playback time (e.g., tail end) of the content item. In one embodiment, the computing device identifies the largest frequency shift based on a change in the number of metadata tags. In other embodiments, the computing device identifies the largest frequency shift based on the largest percentage of the number metadata tags for the content item within the time window. In further embodiments, the computing device identifies the largest frequency shift having least 12% of all metadata tags for the content item within the time window.

In the event of an equal change in the number of tags across time windows, the computing device may select the grouped metadata tags having the latest playback times. The time window with the largest number of metadata tags may be assigned a confidence value by the computing device. The confidence value is the percentage of all metadata tags for the content items for each group of metadata tags. The interrupt time selected by the computing device may be beginning of the time window. In other embodiments, the interrupt time may be selected from the end of the time window by the computing device. The method terminates in step 320.

In some embodiments, the selection of the interrupt time by the computing device may include providing recommendations for similar content items. The similar content items may include subsequent episodes in a series. The recommendations for the similar content items are based on the interrupt times of tagged content items in the subset of the plurality of the content items that are part of the series.

Accordingly, the computing device provides post-roll content during playback of the content items. The computing device processes the recommendations to select the appropriate interrupt time for the rendered content item. The rendered post-roll content includes commercial, promotions, or subsequent content items for a series of content items. The subsequent content items may include unaired content items in at least one embodiment. The post-roll content may obtain focus and the rendered content item may lose focus. For instance, the rendered content item may be reduced in size, volume, or resolution; and the post-roll content may be provided in a prominent location at a louder, larger, or better resolution than the rendered content item.

The embodiments of the invention include a system for managing metadata tags. The metadata tags for a plurality of rendered content items are stored by the computing device. The computing device processes the metadata tags to identify interrupt times for each content item. The computing device generates recommendations that include predictions for interrupt times of similar content items. The recommendations for unaired content items may be based on content items that have metadata tags. In one embodiment, the computing device processes aired content items in the same season and series to predict the interrupt times for unaired content items (e.g., content items without metadata tags). The aggregation of interrupt times for each content item in a series may, in one embodiment, be analyzed to identify erroneous metadata tags or problems with the content items.

Figure 4:
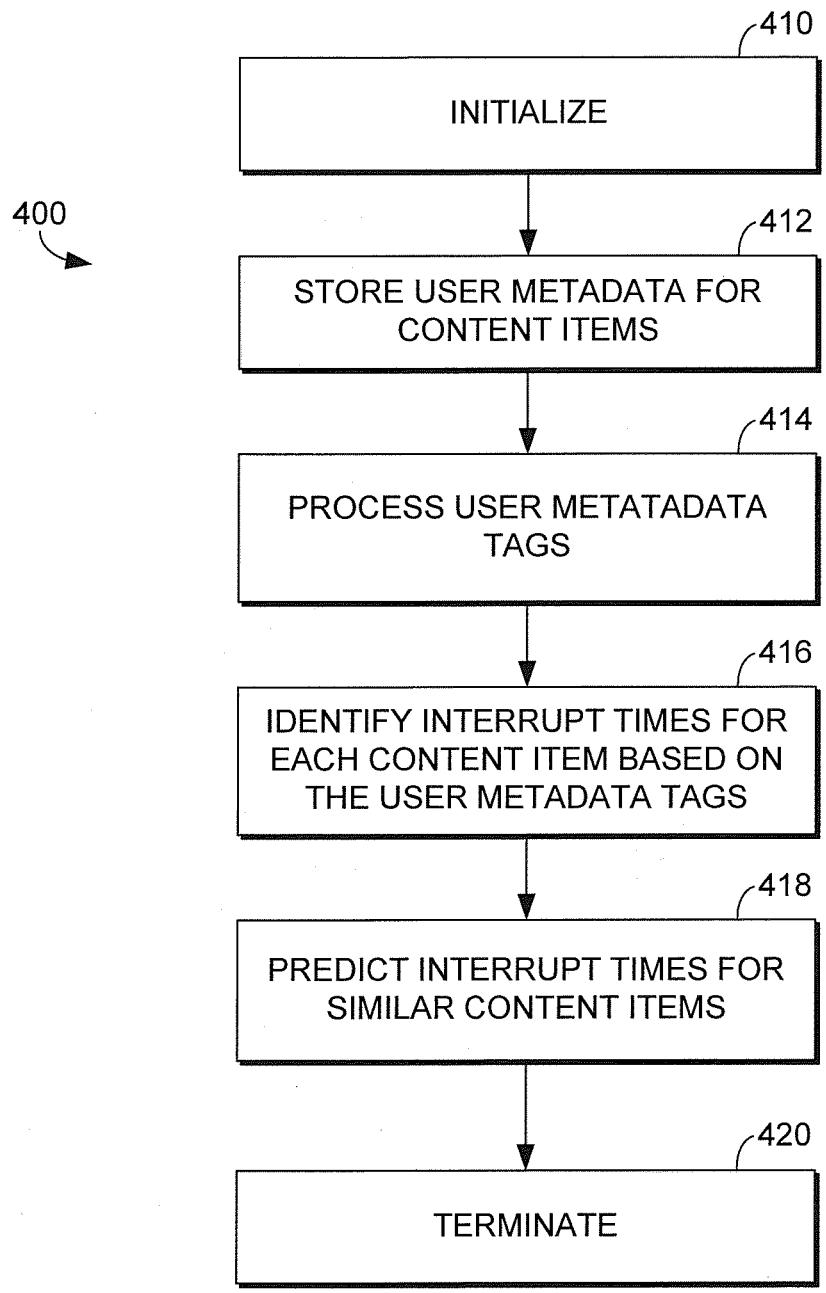
FIG. 4 is another logic diagram illustrating a computer-implemented method of generating recommendations for content items, in accordance with embodiments of the invention.

FIG. 4 is another logic diagram illustrating a computer-implemented method of generating recommendations for content items, in accordance with embodiments of the invention. The recommendations generated by a computing system for content items that are part of a series of episodes may be based on the interrupt times for aired content items having metadata tags stored in the metadata database.

The method initializes in the computing system at step 410. The computing system includes a metadata database and a server. The metadata database stores, in step 412, identifiers for a plurality of content items. For each of the plurality of content items, the metadata database stores metadata tags that correspond to user interactions with the plurality of content items, and times associated with the user interactions with each of the plurality of content items.

The server obtains a collection of metadata tags for each content item. In step 414, the server processes the metadata tags. In turn, the server identifies, in step 416, interrupt times for each content item based on the metadata tags corresponding to each content item. In step 418, the server predicts interrupt times for similar content items. The similar content items are videos or audio media. In one embodiment, the similar content items are episodes in a series and include unaired episodes content items.

Accordingly, the computer system may predict the appropriate interrupt time for similar content items. In some embodiments, the computer system also performs error checking on the data using the metadata tags for content items that belong to a series. The computer system may generate a set of histograms that may be used visually locate outliers (e.g., metadata tags or content items). The metadata tags associated with non-outliers may be removed or ignored when the computing device generates recommendations in at least one embodiment. For instance, if the metadata database has metadata tags for more than a percentage (e.g., 40%) of content item (e.g., episodes) for a given season (Fall, Winter, Summer, Spring), the computing system may calculate the average interrupt time from all content items within the season (season average). In turn, the computing system calculates the standard deviation for all content items within the season based on the season average. For each content item, the computing system determines whether the difference between the season average interrupt time and the content item's interrupt time is greater than the standard deviation. If the difference is greater than the standard deviation, the computing system marks the content items as outliers.

When at least one outlier is identified by the computer system, the season average is calculated without considering the interrupt times for outliers. The computer system recalculates the season average without considering outliers. For each content item, when the difference between the recalculated season average and the content item's offset is less than or equal to the standard deviation, the content items are marked as rollup candidates. The rollup candidates may have their metadata tags removed from the database by the computing device.

The computer system may remove metadata for some content items. In one embodiment, when the computer system identifies at least four content items that are marked a rollup candidates, the computer system may associate the season average with each content item, and remove the metadata for the content items that are identified as rollup candidates. Additionally, in one embodiment, the computer system may optionally remove metadata for some outlier content items. For each outlier content item having an interrupt time that is greater than the season average plus standard deviation, the computer system removes the metadata data. In some embodiment, the computer system may associate the season average with the content items. In one embodiment, the computer system may retain metadata for outliers that are close to the season average. The method terminated in step 420.

The various embodiments of the invention provide a graphical user interfaces for rendering playback controls for content items that processed on the computing device. The controls include stop, pause, fast-forward, change playback speed, etc. Based on user interaction with the controls, the computing device may modify the output of the content item.

Figure 5:
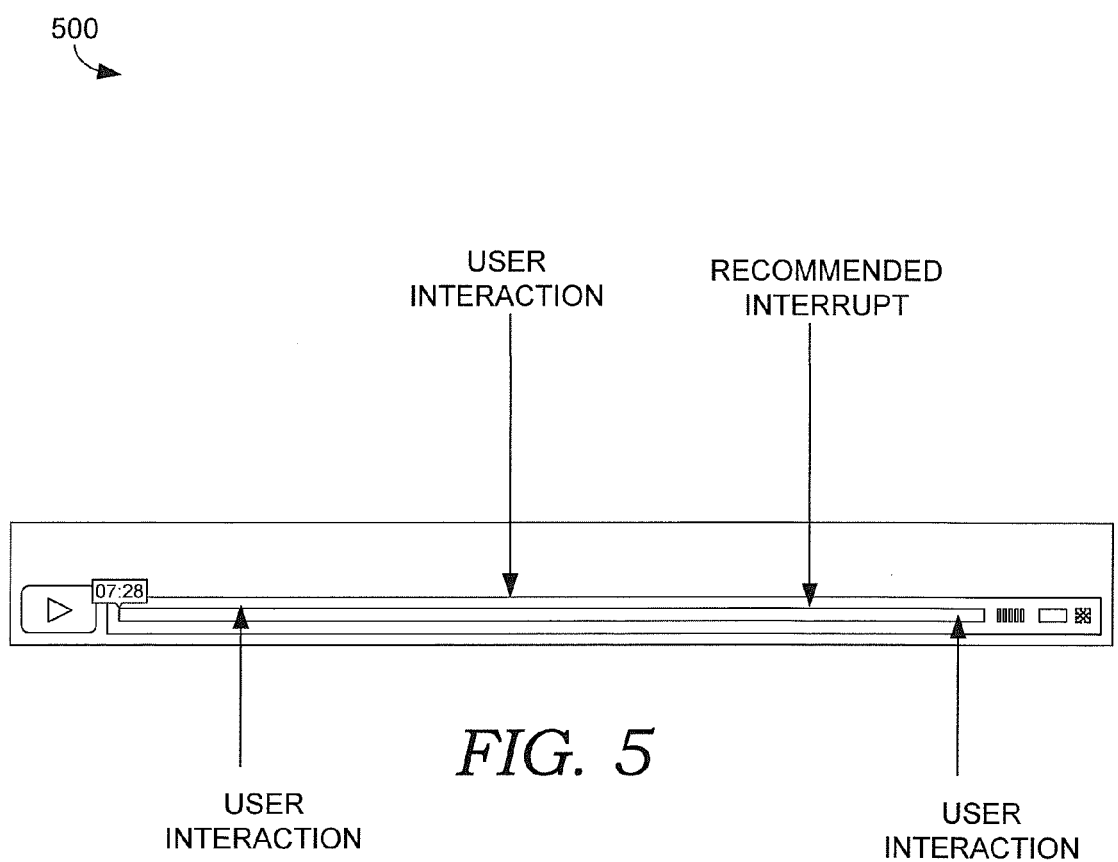
FIG. 5 is a screenshot illustrating an exemplary graphical user interface for user interaction during playback of content items, in accordance with embodiments of the invention.

FIG. 5 is a screenshot illustrating an exemplary graphical user interface for user interaction during playback of content items, in accordance with embodiments of the invention. The graphical user interface 500 is rendered by the computing device. The graphical user interface 500 includes a playback control. As user interactions are received at the computing device, the computing device may record the playback time and the type of user interaction (e.g., pause, play, etc.). In turn, user interactions and playback time are transmitted to a server device that provides recommended interrupt times for the content items rendered on the computing device.

In summary, embodiments of the invention provide a computing system that is configured to receive user interaction during content item playback and to generate recommendations based on the user interactions. A server device may encode the user interactions and playback times in content item metadata tags. Based on the metadata tags, the computing system generate recommendation for the rendered content items and for similar content items to the rendered content items. In one embodiment, the recommendation engine may provide a playlist of content items (e.g. audio files) based on user interactions.

In one embodiment, a computer-implemented method for associating metadata tags with a plurality of content items is provided. The method executed by the computer comprises obtaining time and user interaction information for each of the plurality of content items. Tags are associated with each of the plurality of content items at the time of user interaction. The tags vary based on the type of user interaction. For each content item, the following is performed. The tags are grouped based on type of user interaction at various time segments within the playback duration of the content item. The tags within each group are counted to identify the group with the largest number of tags. The times associated with the grouped tags are retrieved to select an interrupt time for the content item based on the time associated with the largest number of grouped tags.

The embodiment of paragraph [0069], wherein the times are specific playback times for each of the content items and the user interaction is received during the specific playback time of the content item.

The embodiment of paragraph [0069], wherein the user interaction includes any of the following: fast-forward, rewind, stop, pause, mute, change volume, change size, change playback speed, and change quality.

The embodiment of paragraph [0069], wherein each user interaction has a different tag and the plurality of content items are videos or audio media.

The embodiment of paragraphs [0071] or [0072], wherein a subset of the plurality of content items are part of a series and the selection of the interrupt time further comprises providing recommendations for subsequent episodes in a series based on the interrupt times of tagged content items in the subset of the plurality of the content items that are part of the series.

The embodiment of paragraph [0069], wherein the groups are formed within one or more time windows.

The embodiment of paragraph [0074], wherein the size of the window varies.

In another embodiment, a computer system for managing metadata tags is provided. The computer system comprising a metadata database and a server. The metadata database storing a plurality of content items, tags corresponding to user interactions with the plurality of content item, and times associated with the user interactions with the plurality of content items. The server processing the tags and identify interrupt times for each content item based on the tags corresponding to each content item and to predict interrupt times for similar content items.

The embodiment of paragraph [0076], wherein the similar content items are episodes in a series.

The embodiment of paragraph [0076], wherein the similar content items are unaired episodes.

The embodiment of paragraph [0076], wherein the recommendations for content items that are part of series of episodes are based on the interrupt times for aired content items having tags in the metadata database.

The embodiment of paragraph [0076], wherein the similar content items are videos or audio media.

Accordingly, embodiments of the invention may be described in the general context of computer-executable instructions, such as program modules, being executed by a computer. Generally, program modules include routines, programs, objects, components, data structures, etc., that perform particular tasks or implement particular abstract data types. The embodiments may also be practiced in distributed computing environments or cloud environments, where tasks are performed by remote-processing devices that are linked through a communications network. In a distributed computing environment, program modules may be located in both local and remote computer storage media including memory storage devices.

Moreover, one of ordinary skill in the art can appreciate that there are a variety of ways of making different methods, devices, or computer-readable media that achieve the same result. Aspects of the embodiments of the invention have been described in terms of illustrative embodiments thereof. Numerous other embodiments, modifications, and variations within the scope and spirit of the appended claims will occur to persons of ordinary skill in the art from a review of this patent.

The invention claimed is:

1. A computer-implemented method for determining an interrupt time, the method comprising:
   obtaining a plurality of stop events for a content item rendered on a plurality of computing devices, wherein each stop event corresponds to a time of the content item;
   associating a plurality of stop event tags with the content item, each stop event tag corresponding to one of the obtained stop events and being associated with the content item at the corresponding time;
   grouping each stop event tag into a corresponding time window of the content item, the content item having a plurality of time windows;
   identifying, for each time window, a frequency shift of stop event tags grouped therein, the frequency shift being based a number of stop event tags grouped into the corresponding time window; and determining the interrupt time for the content item based on a maximum identified frequency shift corresponding to at least one time window in at least a portion of the content item.

2. The method of claim 1, wherein when the maximum identified frequency shift corresponds to two or more consecutive time windows, the interrupt time for the content item is further based on a latest occurring time window of the two or more consecutive time windows.

3. The method of claim 1, further comprising:
generating a predicted interrupt time for at least one similar content item based at least in part on the determined interrupt time for the content item.

4. The method of claim 1, further comprising:
generating at least one histogram based on the associated plurality of stop event tags; and
removing outlier stop event tags based on the generated at least one histogram.

5. The method of claim 1, the at least a portion of the content item being a selected portion of the content item.

6. The method of claim 1, the at least a portion of the content item being a tail end portion of the content item.

7. The method of claim 1, the determined interrupt time being one of a beginning time and an ending time of a particular time window that corresponds to the maximum identified frequency shift.

8. The method of claim 1, further comprising:
providing, during a rendering of the content item, a post-roll content item at the determined interrupt time, wherein the post-roll content item is one of a commercial and a promotion.

9. The method of claim 1, further comprising:
providing, during a rendering of the content item, a subsequent content item at the determined interrupt time, wherein the subsequent content item is one of a series of content items associated with the rendered content item.

10. The method of claim 8, the post-roll content item being provided as an overlay to the rendered content item.

11. A non-transitory computer storage medium storing computer-useable instructions that, when used by one or more computing devices, cause the one or more computing devices to perform operations comprising:
obtaining a plurality of stop events for a content item rendered on a plurality of computing devices, wherein each stop event corresponds to a time of the content item;
associating a plurality of stop event tags with the content item, each stop event tag corresponding to one of the obtained stop events and being associated with the content item at the corresponding time;
associating each stop event tag into a corresponding time window of the content item, the content item having a plurality of time windows;
identifying, for each time window, a corresponding frequency shift, the frequency shift being based on a number of stop event tags associated with the time window; and
determining the interrupt time for the content item based on a maximum identified frequency shift in at least a portion of the content item.

12. The medium of claim 11, the at least a portion of the content item being a selected portion of the content item.

13. The medium of claim 11, the at least a portion of the content item being a tail end portion of the content item.

14. The medium of claim 11, wherein the frequency shift is a percentage of the plurality of stop event tags.

15. The medium of claim 11, further comprising:
assigning a confidence value to a particular time window that corresponds to the maximum identified frequency shift.

16. The medium of claim 11, wherein when the maximum identified frequency shift corresponds to two or more consecutive time windows, the interrupt time for the content item is further based on a latest occurring time window of the two or more consecutive time windows.

17. A computerized system comprising:
one or more processors; and
one or more computer storage media storing computer-usable instructions that, when used by the one or more processors, cause the one or more processors to:
obtain a plurality of stop events for a content item rendered on a plurality of computing devices, wherein each stop event corresponds to a time of the content item;
associate a plurality of stop event tags with the content item, each stop event tag corresponding to one of the obtained stop events and being associated with the content item at the corresponding time;
associate each stop event tag into a corresponding time window of the content item, the content item having a plurality of time windows;
identify, for each time window, a corresponding frequency shift, the frequency shift being based on a number of stop event tags associated with the time window; and
determine the interrupt time for the content item based on a maximum identified frequency shift corresponding to at least one time window in at least a portion of the content item.

18. The system of claim 17, wherein when the maximum identified frequency shift corresponds to two or more consecutive time windows, the interrupt time for the content item is further based on a latest occurring time window of the two or more consecutive time windows.

19. The system of claim 17, the one or more computer storage media storing computer-usable instructions that, when used by the one or more processors, further cause the one or more processors to:
provide, during a rendering of the content item, a post-roll content item at the determined interrupt time, wherein the post-roll content item is one of a commercial and a promotion provided as an overlay to the rendered content item.

20. The system of claim 17, the one or more computer storage media storing computer-usable instructions that, when used by the one or more processors, further cause the one or more processors to:
provide, at the determined interrupt time when rendering the content item, a subsequent content item, wherein the subsequent content item is one of a series of content items associated with the rendered content item.

* * * * *